US 11,776,426 B1

United States Patent
Hoffman

(10) Patent No.: US 11,776,426 B1
(45) Date of Patent: Oct. 3, 2023

(54) DENTISTRY TRAINING APPARATUS

(71) Applicant: Clayton Hoffman, Platte, SD (US)

(72) Inventor: Clayton Hoffman, Platte, SD (US)

( * ) Notice: Subject to any disclaimer, the term of this patent is extended or adjusted under 35 U.S.C. 154(b) by 0 days.

(21) Appl. No.: 18/116,575

(22) Filed: Mar. 2, 2023

(51) Int. Cl.
*G09B 23/28* (2006.01)
*A61G 15/16* (2006.01)
*A61C 17/06* (2006.01)

(52) U.S. Cl.
CPC ............ *G09B 23/283* (2013.01); *A61C 17/06* (2019.05); *A61G 15/16* (2013.01)

(58) Field of Classification Search
CPC ........ G09B 23/283; A61C 17/06; A61G 15/16
USPC .......................................... 434/263
See application file for complete search history.

(56) References Cited

U.S. PATENT DOCUMENTS

| 7,713,063 B2 | 5/2010 | Lee et al. |
| 2007/0178429 A1* | 8/2007 | Bell .................... G09B 23/283 434/263 |

* cited by examiner

*Primary Examiner* — Robert P Bullington
*Assistant Examiner* — Stephen Alvesteffer
(74) *Attorney, Agent, or Firm* — Dale J. Ream

(57) ABSTRACT

A dentistry training apparatus includes a suction assembly that includes a collection portion having a bottom wall and a sidewall extending upwardly from the bottom wall, the bottom wall defining a central aperture in fluid communication with a liquid suction device. A support tray is positioned atop the collection portion and includes a plurality of legs configured to displace the support tray above the bottom wall, the support tray including a lower wall and a support tray sidewall extending upwardly from a peripheral edge of the lower wall. The lower wall of the support tray defines a hole having a circular configuration for selectively receiving an endodontic cup. An apex locator lead is electrically connected to a power source and positioned atop the bottom wall of the suction assembly, the apex locator lead being registered with the hole so as to engage the endodontic cup when received in the aperture.

15 Claims, 5 Drawing Sheets

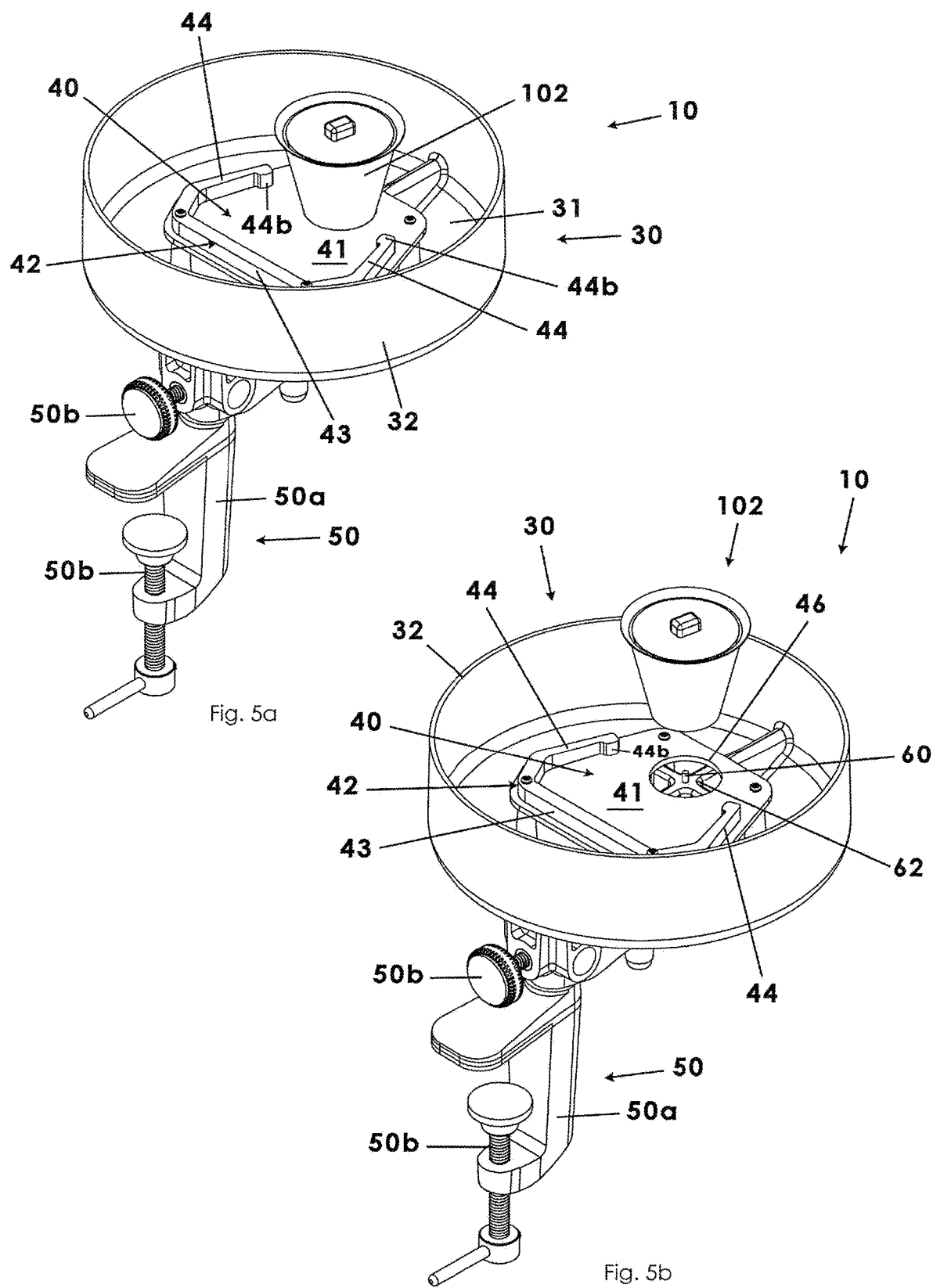

DENTISTRY TRAINING APPARATUS

BACKGROUND OF THE INVENTION

This invention relates generally to dental equipment and, more particularly, and apparatus for hands on teaching of dentistry techniques and, especially, endodontic or root canal simulation.

Persons training to perform dentistry techniques may use a dentoform model (or simply called a dentoform) that simulates conditions that may be encountered in dental practice. For example, a dentoform may be configured to resemble a patient's teeth and gums arranged in an anatomically realistic manner and that may be mounted to an actual dentistry chair or simply to a countertop where a dental student is able to practice filling cavities, applying crowns, or the like. In more advanced training scenarios, dental students need to learn endodontic procedures. More particularly, endodontics focuses on the treatment of diseases and disorders associated with the dental pulp. This typically involves complete removal of the inflamed or infected pulp tissue in the root canal. Having a successful root canal procedure is often a last resort to save an infected tooth from complete removal from the patient's mouth. It is important that all pulp tissue be removed from the pulp chamber, also known as a root canal, of an infected tooth as failure to remove all pulp tissue may lead to infection and pain for the patient and may lead to a need for further oral surgery. However, if the endodontic procedure is performed beyond the length of the root apex, the periodontal ligament within a tooth may be perforated and lead to severe tooth sensitivity. Therefore, proper simulation, demonstration, and hands-on training in properly locating a root apex at the canal terminus prior to instrumentation is critical.

Therefore, it would be desirable to have a dental training apparatus for simulating both routine dentistry techniques as well as endodontic techniques. Further, it would be desirable to have a dental training apparatus that simulates endodontic dentistry in a real-world environment, including simulated suctioning of water and dental material.

SUMMARY OF THE INVENTION

A dentistry training apparatus according to the present invention includes a suction assembly that includes a collection portion having a bottom wall and a sidewall extending upwardly from a peripheral edge of the bottom wall, the bottom wall defining a central aperture in fluid communication with a liquid suction device. A support tray is positioned atop the collection portion and includes a plurality of legs configured to displace the support tray above the bottom wall, the support tray including a lower wall and a support tray sidewall extending upwardly from a peripheral edge of the lower wall. The lower wall of the support tray defines a hole having a circular configuration for selectively receiving an endodontic cup. An apex locator lead is electrically connected to a power source and positioned atop the bottom wall of the suction assembly; the apex locator lead being registered with the hole so as to engage the endodontic cup when received in the aperture.

Therefore, a general object of this invention is to provide a dentistry training apparatus having a dentoform holding assembly that imparts tension to a dentoform so as to hold it securely during training.

Another object of this invention is to provide a dentistry training apparatus, as aforesaid, that is coupled to a funnel having a suction action that simulates a real world dentistry procedure.

Still another object of this invention is to provide a dentistry training apparatus, as aforesaid, that specifically holds an alginate cup in communication with a conductive rod for using an electrical circuit to simulate the location of a root apex in a live patient.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b of FIG. 4a;

FIG. 5a is a perspective view of the dentistry training apparatus as in FIG. 1, illustrated with an endodontic cup in a nested relationship; and FIG. 5b is a perspective view of the dentistry training apparatus as in FIG. 5a, illustrated in an exploded configuration.

DESCRIPTION OF THE PREFERRED EMBODIMENT

Figure 1:
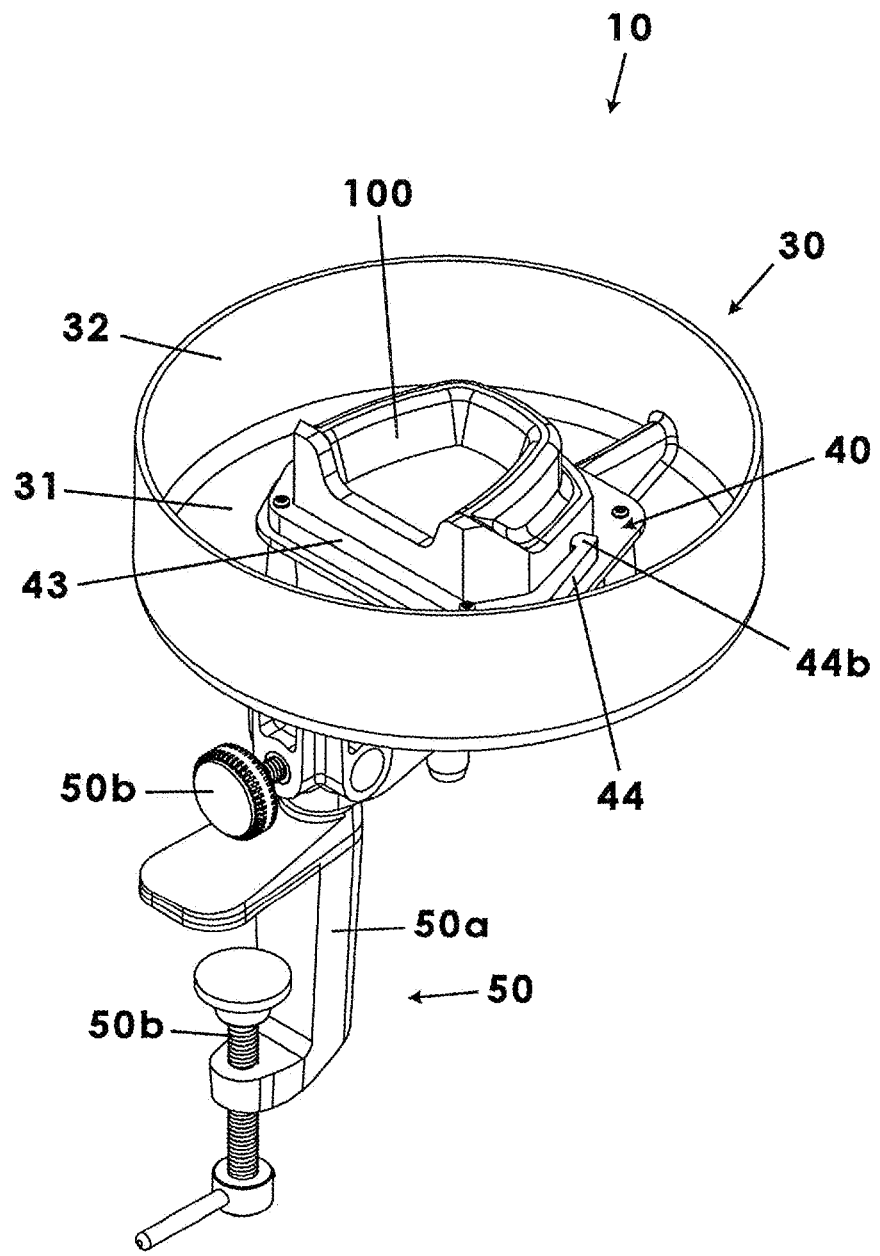
FIG. 1 is a perspective view of a dentistry training apparatus according to a preferred embodiment of the present invention.
Figure 2:
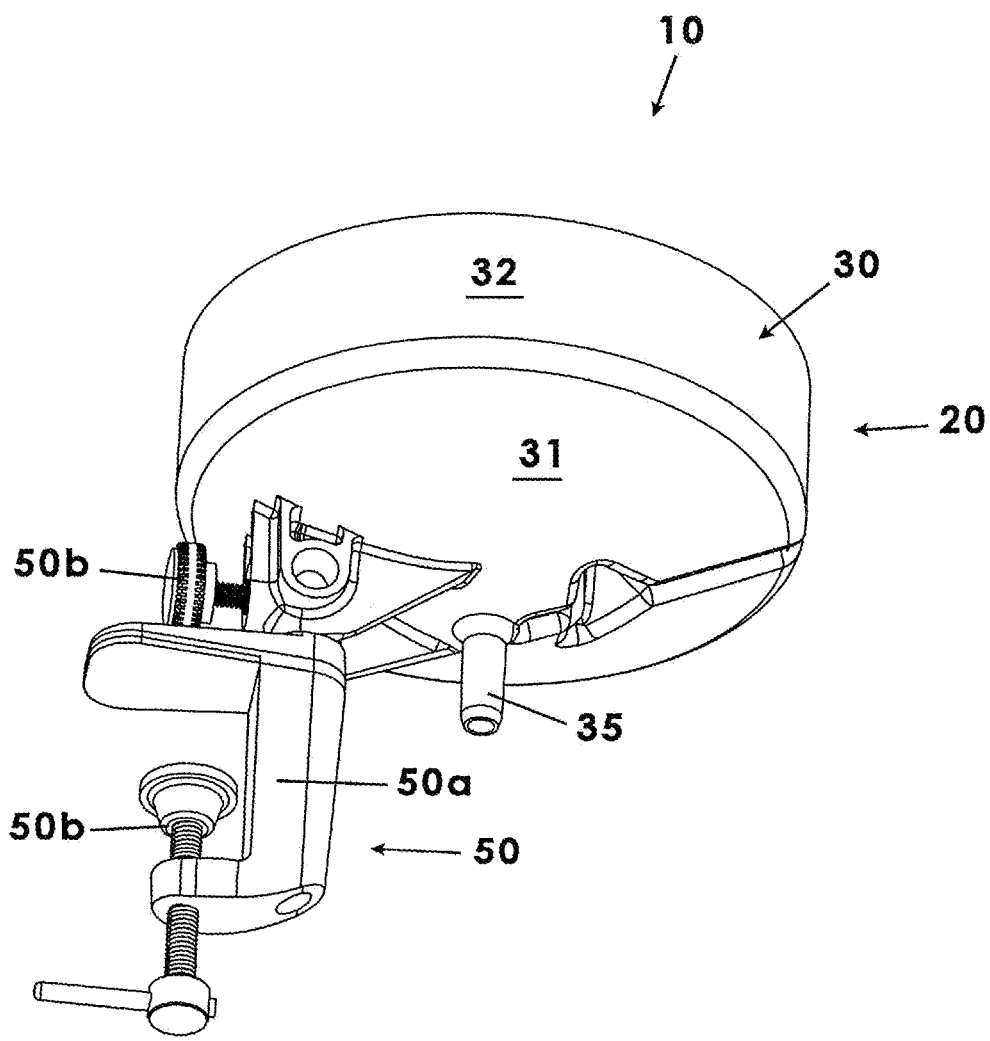
FIG. 2 is a perspective view from a lower perspective of the dentistry training apparatus as in FIG. 1.

A dentistry training apparatus according to a preferred embodiment of the present invention will now be described with reference to the accompanying drawings. The dentistry training apparatus 10 includes a suction assembly 20 having a collection portion 30 in fluid communication with a suction device, and a support tray 40 that is elevated above a bottom wall of the collection portion 30 and that includes a tray sidewall having a trapezoidal configuration and a pair of resilient arms for engaging and holding a dentoform 100. Further, the dentistry training apparatus 10 includes an apex locator lead 60.

Preferably, the dentistry training apparatus 10 may be coupled to an actual dentistry chair (not shown) for authenticity in the training of dentistry students. Alternatively, the dentistry training apparatus 10 may be coupled to a traditional training bench. In either case, the dentistry training apparatus 10 may include one or more clamping assemblies 50, each having a clamp 50a and an adjustable fastener 50b such as a threaded knob and bolt combination, or the like.

In a critical aspect, the dentistry training apparatus 10 includes a suction assembly 20 configured to collect water that may be sprayed on a dentoform 100, the water then being suctioned away in a manner of a dental assistant spraying water into a patient's mouth during a dental procedure and then suctioning it back out before the patient would need to swallow it. The suction assembly 20 includes a collection portion 30 and a drainage portion 35 extending downwardly and away from the collection portion 30. More particularly, the collection portion 30 includes a bottom wall 31 having a generally circular configuration and includes a sidewall 32 extending upwardly from a peripheral edge of the bottom wall 31. The sidewall 32 may be referred to as an upstanding wall or a containment wall as it is intended that water sprayed on the dentoform 100 as well as other dental materials will be contained and directed toward the bottom wall 31. The bottom wall 31 defines an aperture 33 through which collected water may be directed.

Further, the suction assembly 20 includes a drainage portion 35 coupled to a bottom side of the collection portion 30 at a position that is in fluid communication with the aperture 33. More particularly, the drainage portion 35 may have a tubular configuration that is mounted to or integrally constructed with the aperture 33 such that collected water will drain into the drainage portion 35 via gravity. In an embodiment, the drainage portion 35 may be constructed as a funnel or may be a hose connected to the aperture 33 with an interface or coupling. Preferably, the drainage portion 35 may be coupled to a water reservoir and suction pump operable to forcibly suction collected water downwardly from the collection portion 20 in a manner representative of a dental assistant suctioning water from a patient's mouth. The suctioning pump is not shown in the present drawings in that dental suction pumps are well-known to those of ordinary skill in the art and the suction device is beyond the scope of the present invention.

In another critical aspect, the dentistry training apparatus 10 includes a support tray 40 having structures that are strategically positioned proximate to and elevated above the collection portion 30 so as to train dental students and, particularly, dental specialists, in the art and science of endodontics.

Accordingly, the support tray 40 according to the present invention has a structure that enables student of endodontics to practice on a complete dentoform, partial dentoform, or single tooth. The ability of an endodontist to identify the positions, configurations, and measurements of the canal terminus is of critical importance to a root canal procedure. Specifically, an endodontist must be able to identify the apex of a tooth, i.e., the endpoint or terminus of the canal. In conducting a root canal procedure, the endodontist has to completely remove all the remaining pulp tissue from the crown and from the root canal or canals depending on the tooth. They have to know exactly where the apical foramen is located and clean, shape, and obturate to this point. Sometimes it can be difficult to locate this foramen, so dentists use special techniques, including x-rays and apex locators that help them in the process.

Figure 3:
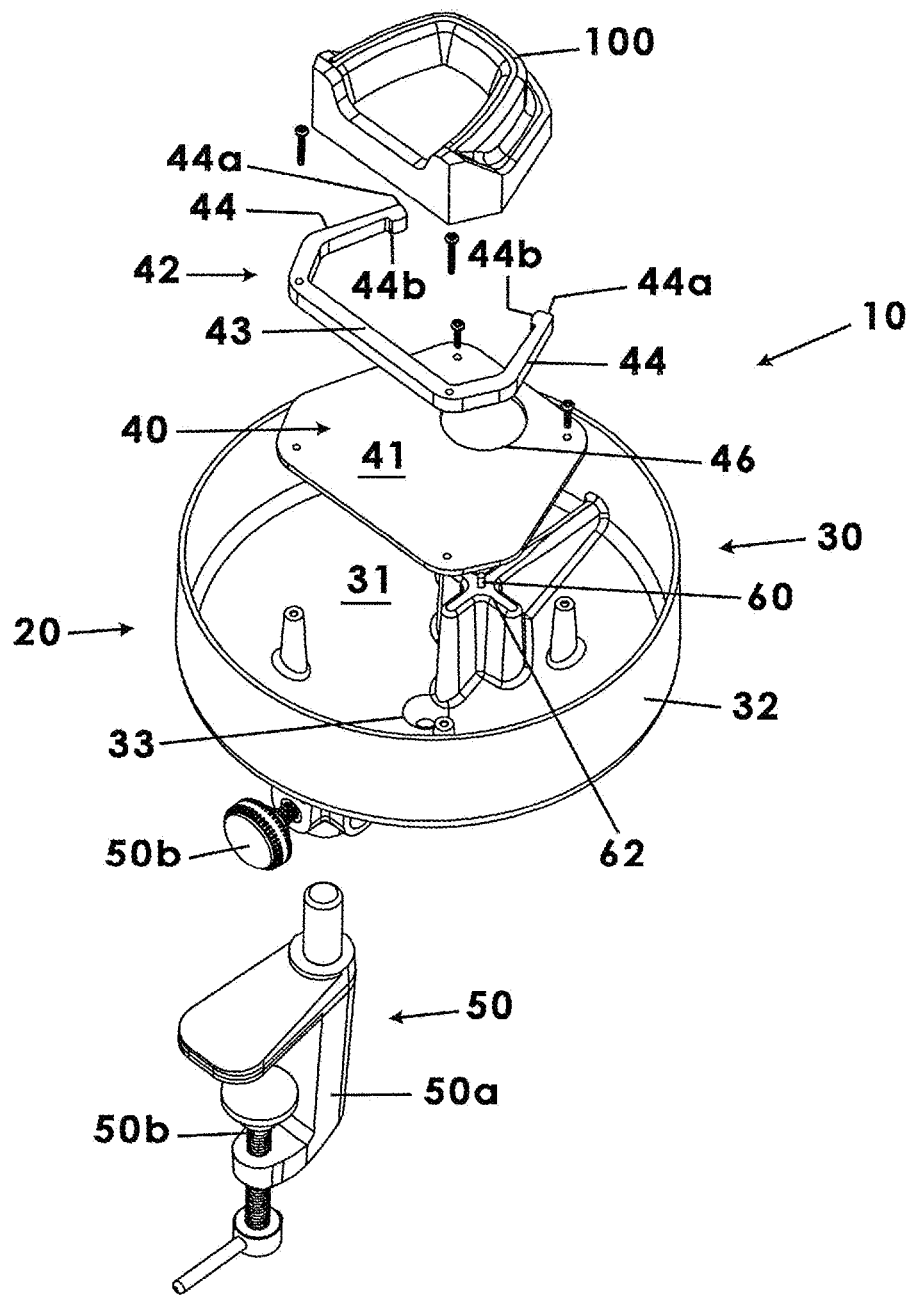
FIG. 3 is an exploded view of the dentistry training apparatus as in FIG. 1.
Figure 4A:
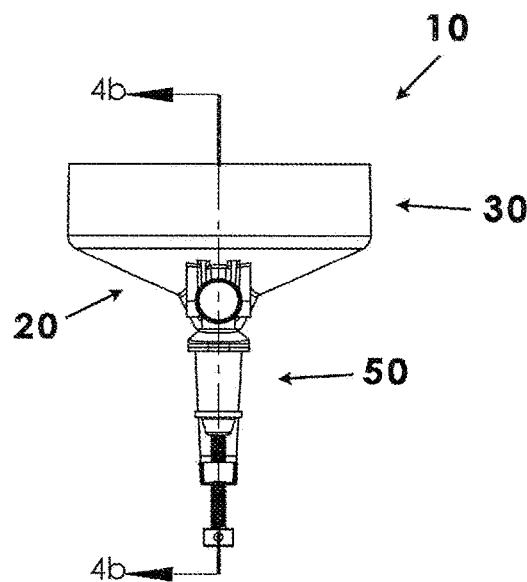
FIG. 4a is a side view of the dentistry training apparatus as in FIG. 1.
Figure 4B:
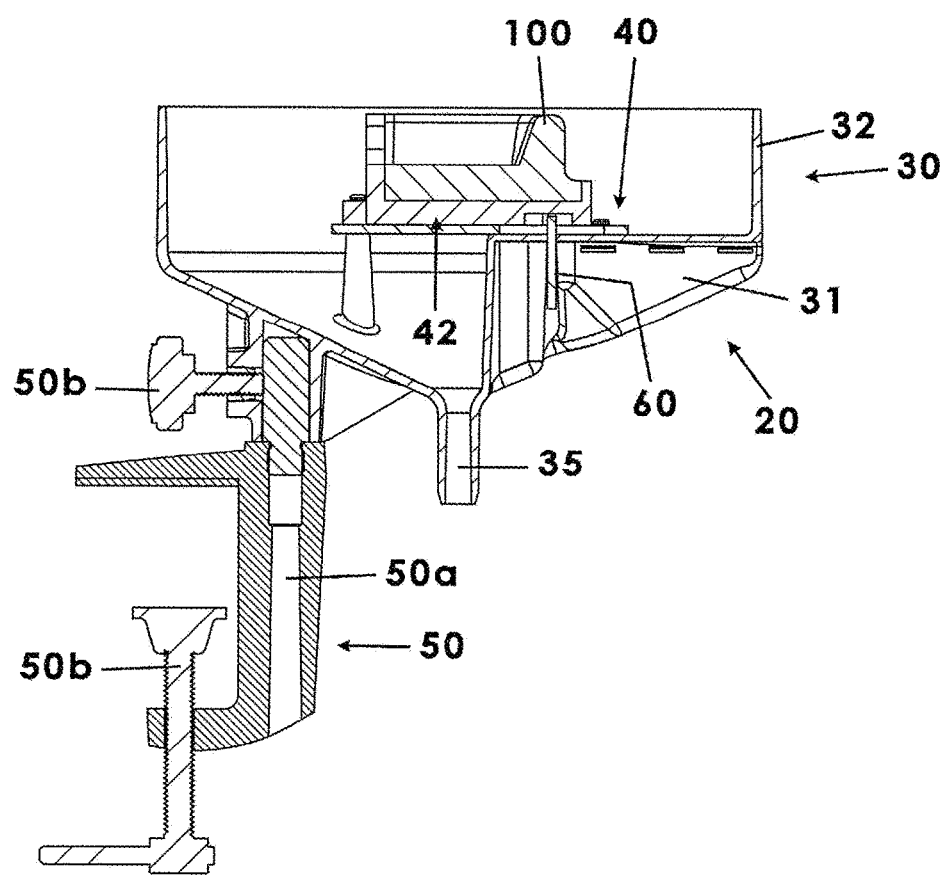

Accordingly, the support tray 40 includes structures for securely holding a dentoform 100 and also for supporting a cup 102 with a natural tooth or simulated tooth in a conductive medium. The support tray 40 may include a lower wall 41 and a support tray sidewall 42 extending upwardly from a peripheral edge of the lower wall 41. In an embodiment, the support tray sidewall 42 may include an upstanding tray back wall 43 coupled to a rear edge of the lower wall 41 of the support tray 40 and may include a pair of sidearms 44 each being coupled to opposed ends of the tray back wall 43, respectively. (FIGS. 1 and 3). Each side arm 44 may include a free end 44a between which is defined and open front, i.e., there is a void between the ends 44a. Preferably, the pair of sidearms 44 are each constructed of a resilient material that are operatively biased toward one another. Suitable materials may be spring steel, alloys, and suitably molded plastic. Further, each free end 44a may include a nub 44b, also referred to as a grip member, that is configured to grip a dentoform 100 that may be inserted interiorly between the walls of the sidewall 42. In addition and as shown in FIG. 1, the walls of the support tray 40 may have a trapezoidal configuration that, together, form a recessed area configured to receive a dentoform 100 is a securely nested relationship. Again, the pair of sidearms 44 may be flexed outwardly that are biased inwardly so as to grip and hold securely a dentoform 100

In another aspect, the lower wall 41 of the support tray 40 may define a hole 46 having a circular configuration for selectively and operatively receiving an endodontic cup 102. In endodontic training, an endodontic cup 102 may be filled with conductive material along with a real or simulated tooth for use in determining tooth length and, more particularly, the location of apical foramen material found at the apex of the root.

Apex locators are electronic instruments used in endodontics that measure the impedance, frequency and resistance of the surrounding material in order to locate the working length of the root canal to be filled. Correct determination of tooth length is a crucial factor for the success of endodontic therapy. Accordingly, the dentistry training apparatus 10 according to the present invention includes an apex locator lead 60 positioned within the space between the bottom wall 31 of the collection portion 30 and the hole 46 defined by lower wall 41 of the support tray 40. It is understood that the apex locator lead 60 may be electrically connected to an AC electrical source such as a wall outlet or a battery and, in connection with the endodontic cup 102 may form an electrical circuit that is operative to determine measurements within the endodontic cup that are instructive and useful to the dentistry student. It will also be appreciated that the apex locator lead 60 is aligned or "registered" with an imaginary vertical axis defined by the hole 46. Stated another way, the apex locator lead 60 is immediately proximate or vertically adjacent to the hole 46 so as to make electrical contact with the endodontic cup 102 when the cup is supported by the hole 41. The critical position of the apex locator lead 60 is made possible via a platform 62 that extends upwardly from the bottom wall 31 of the collection portion 30. More particularly, a platform 62 extends upwardly from the bottom wall 31 and the apex locator lead 60 is mounted atop the platform 62.

In use, the dentistry training apparatus 10 may be coupled to a dental chair or a training bench and a dentoform 100 may be nested in the support tray 40 as described above. When teaching endodontics, and endodontic cup 102 filled with conductive material may be inserted into the hole 46. Finally, the apex locator lead 60 may be energized to take measurements of a tooth associated with the endodontic top 102. In an embodiment, there may be a display screen and data communication with the apex locator lead 60 configured to display a shape indicative of a tooth root and measurements relative thereto.

It is understood that while certain forms of this invention have been illustrated and described, it is not limited thereto except insofar as such limitations are included in the following claims and allowable functional equivalents thereof.

The invention claimed is:

1. A dentistry training apparatus for attachment to a dental chair, comprising:
   a suction assembly that includes 1) a collection portion having a bottom wall defining a central aperture and a sidewall extending upwardly from a peripheral edge of said bottom wall, and 2) a drainage portion having a tubular configuration including an upper end that is open and in fluid communication with said central aperture of said collection portion; and a support tray positioned atop said collection portion and that includes a plurality of legs configured to displace said support tray above said bottom wall, said support tray including a lower wall and a support tray sidewall extending upwardly from a peripheral edge of said lower wall;

wherein said support tray sidewall includes a trapezoidal configuration so as to form a recessed area configured to receive a dentoform in a nested relationship.

2. The dentistry training apparatus as in claim 1, wherein said support tray sidewall includes an upstanding tray back wall coupled to a rear edge of the lower wall of the support tray and a pair of side arms coupled to opposed ends of said tray back wall.

3. The dentistry training apparatus as in claim 2, wherein said support tray sidewall defines an open front extending between free ends of said pair of sidearms and opposite said tray back wall.

4. The dentistry training apparatus as in claim 3, wherein said pair of sidearms are constructed of a resilient material and configured such that said free ends are biased toward one another.

5. The dentistry training apparatus as in claim 4, wherein each free end of said pair of sidearms includes a nub configured to grip a dentoform.

6. The dentistry training apparatus as in claim 1, wherein said lower wall of said support tray defines a hole having a circular configuration for selectively receiving a endodontic cup.

7. The dentistry training apparatus as in claim 6, further comprising an apex locator lead electrically connected to a power source and positioned atop said bottom wall of said suction assembly, said apex locator lead being registered with said hole so as to engage the endodontic cup when received in said hole.

8. The dentistry training apparatus as in claim 7, further comprising a platform extending upwardly from said bottom wall of said collection portion and having an upper end displaced from said bottom wall, said apex locator lead being mounted atop said upper end.

9. The dentistry training apparatus as in claim 1, further comprising a clamping device operatively coupled to said suction assembly, said clamping device being selectively attached to a dental chair.

10. A dentistry training apparatus for attachment to a dental chair, comprising:

a suction assembly that includes a collection portion having a bottom wall and a sidewall extending upwardly from a peripheral edge of said bottom wall, said bottom wall defining a central aperture in fluid communication with a liquid suction device;

a support tray positioned atop said collection portion and that includes a plurality of legs configured to displace said support tray above said bottom wall, said support tray including a lower wall and a support tray sidewall extending upwardly from a peripheral edge of said lower wall, wherein said lower wall of said support tray defines a hole having a circular configuration for selectively receiving an endodontic cup; and an apex locator lead electrically connected to a power source and positioned atop said bottom wall of said suction assembly, said apex locator lead being registered with said hole so as to engage the endodontic cup when received in said aperture.

11. The dentistry training apparatus as in claim 10, wherein said support tray sidewall includes a trapezoidal configuration so as to form a recessed area configured to receive a dentoform in a nested relationship.

12. The dentistry training apparatus as in claim 11, wherein said support tray sidewall includes an upstanding tray back wall coupled to a rear edge of the lower wall of the support tray and a pair of side arms coupled to opposed ends of said tray back wall.

13. The dentistry training apparatus as in claim 12, wherein said support tray sidewall defines an open front extending between free ends of said pair of sidearms and opposite said tray back wall.

14. The dentistry training apparatus as in claim 13, wherein said pair of sidearms are constructed of a resilient material and configured such that said free ends are biased toward one another.

15. The dentistry training apparatus as in claim 10, further comprising a platform extending upwardly from said bottom wall of said collection portion and having an upper end displaced from said bottom wall, said apex locator lead being mounted atop said upper end.

\* \* \* \* \*